United States Patent

Vanstone et al.

(10) Patent No.: US 6,713,722 B2
(45) Date of Patent: Mar. 30, 2004

(54) ROTOR AND METHOD FOR WELDING AN ELEMENT OF A ROTOR

(75) Inventors: Rodney William Vanstone, Rugby (GB); Ian John Chilton, Rugby (GB); Ranjit Ramchandra Ballal, Ullesthorpe (GB); Stuart Leech, Lutterworth (GB)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/071,077

(22) Filed: Feb. 11, 2002

(65) Prior Publication Data

US 2003/0116549 A1 Jun. 26, 2003

(30) Foreign Application Priority Data

Dec. 21, 2001 (GB) .............................................. 0130735

(51) Int. Cl.$^7$ ................................................. B23K 9/00
(52) U.S. Cl. .......................... 219/137 WM; 219/137 R
(58) Field of Search ................................ 219/137 WM, 219/136, 137 R; 148/639

(56) References Cited

U.S. PATENT DOCUMENTS

| | | | | |
|---|---|---|---|---|
| 3,999,030 A | * | 12/1976 | Nakazaki et al. | .... 219/121 EM |
| 4,497,670 A | * | 2/1985 | Siga et al. | ................. 148/12 R |
| 5,024,582 A | * | 6/1991 | Bellows et al. | ......... 416/213 R |
| 5,688,420 A | | 11/1997 | Gotoh et al. | |
| 5,704,765 A | * | 1/1998 | Amos et al. | ............ 416/244 A |
| 5,914,055 A | * | 6/1999 | Roberts et al. | .......... 219/76.15 |

FOREIGN PATENT DOCUMENTS

| | | | |
|---|---|---|---|
| EP | 0 870 573 A1 | 10/1998 | |
| EP | 0870573 | * 10/1998 | ........... B23K/35/30 |
| JP | 10-6079 | 1/1998 | |
| JP | 10-58187 | 3/1998 | |

* cited by examiner

Primary Examiner—M. Alexandra Elve
(74) Attorney, Agent, or Firm—Burns, Doane, Swecker & Mathis, L.L.P.

(57) ABSTRACT

A method of forming a rotor comprises the step of welding a rotor element. The weld metal comprises: from 0.04 to 0.1% carbon, from 0 to 0.5% silicon, from 0.1 to 0.6% manganese, from 0 to 0.01% sulphur, from 0 to 0.03% phosphorous, from 1.9 to 2.6% chromium, from 0.05 to 0.3% molybdenum, from 0.2 to 0.3% vanadium, from 0.02 to 0.08% niobium, from 1.45 to 2.1% tungsten, from 0 to 0.03% nitrogen, from 0.0005 to 0.006% boron and from 0 to 0.03% aluminium. The rotor element may be formed from steel which comprises from 0.15 to 0.35% carbon, from 0 to 0.3% silicon, from 0.2 to 1% manganese, from 0 to 0.03% sulphur, from 0 to 0.03% phosphorous, from 0.3 to 1% nickel, from 0.7 to 1.50% chromium, from 0.5 to 1.2% molybdenum, and from 0.2 to 0.4% vanadium.

30 Claims, 1 Drawing Sheet

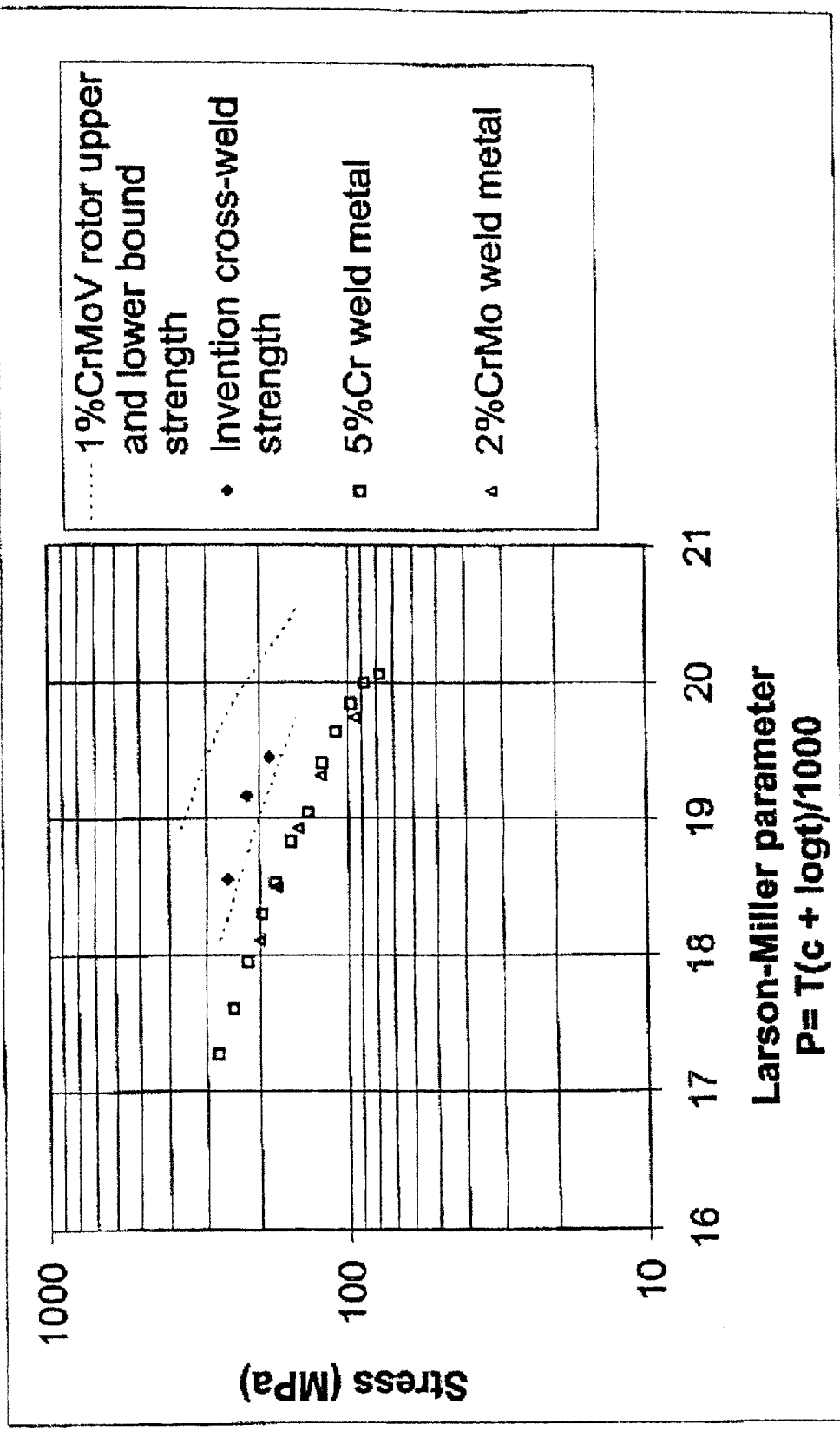

ROTOR AND METHOD FOR WELDING AN ELEMENT OF A ROTOR

FIELD OF THE INVENTION

The invention relates to a rotor and a method for welding an element of a rotor. Particularly, but not exclusively, the invention relates to a low alloy, high temperature rotor for use in a turbine and a welding method, which method can be used in assembling components of the rotor together during manufacture or for repairing the rotor post-manufacture.

BACKGROUND OF THE INVENTION

Turbine rotors are typically constructed from low alloy steel. In one known construction, the rotor comprises a monobloc body formed from a single forging. In another known construction, the rotor body comprises a series of individual disks, which are welded together. In each case, blades are disposed upon the periphery of the body by a suitable retaining mechanism, of which there are various types. The invention is particularly applicable to these types of rotor, but other types, of which there are many, are not excluded.

Any metal article subjected to stress over a period of time will experience what is known as "creep". Creep is the plastic deformation of the metal over that period and is therefore time-dependent strain. Creep is extremely sensitive to temperature, and sensitivity increases rapidly with rising temperature. After a period of time, creep will ultimately conclude by the generation of a fracture.

Whilst the severe consequences of a fracture should not be underestimated, the situation is mitigated by the fact that it is possible to predict the progression of creep within a rotor with a good degree of accuracy, providing the operating conditions for the rotor are known and controlled. The consequence is that a "creep-life" for a rotor can be predicted, therefore enabling the period of time before a failure should occur to be established. This means that the useful working-life of the rotor (the 'service life') can be determined in advance, thereby ensuring that it is decommissioned or repaired before a failure occurs.

It is desirable for the creep-life of both the initially manufactured rotor and the repaired rotor to be as long as possible. Furthermore, it is highly desirable that the creep-life can be predicted with a high degree of accuracy, not only to ensure that a fracture or failure is avoided, but also to ensure that the service-life (which will always be shorter than the creep-life, the difference being a safety margin) will be relatively close to the creep-life of a particular rotor, thereby avoiding any unnecessary redundancy of use.

A rotor that is approaching the end of its service life is normally repaired by a welding process. Although this invention is highly applicable to a welding process used in the initial manufacture of a rotor, it has particular applicability to a repair process and further discussion will therefore concentrate on a repair process.

The post-repair rotor will have its creep strength affected not only by the parent metal (from which the rotor was originally manufactured), but also the metal used in the production of the repair weld. It is therefore necessary to select a weld metal that will provide sufficiently adequate creep characteristics following the repair. It is, however, also necessary to take into account other characteristics of the post-repair rotor and this will significantly include the thermal expansion coefficients of the various integers of the rotor. If the co-efficient of thermal expansion of the weld metal is significantly different from that of the parent metal, distortions and additional operating stresses will occur, both of which would not only affect the further service-life of the rotor, but also complicate the prediction of the creep-life, requiring, at least, a greater error margin to be built into the measurements and predictions that would need to be made.

With the foregoing requirements in mind, a number of weld metal types have, for example, been used for a typical rotor type, manufactured from 1% CrMoV low alloy steel.

A first such weld metal type has a creep strength which is at least as great as that of the parent metal, but is a higher alloy material, with a lower co-efficient of thermal expansion; one example of this is 12% CrMoV used in association with a 5% Cr weld metal layer between the parent metal and the 12% CrMoV weld metal. A further known alloy material has physical properties which are similar to that of the original parent rotor material, but with lower creep strength, for example low carbon 1% CrMoV or 2% CrMo.

The first of these types, whilst having a sufficiently adequate creep strength, introduces uncertainty by virtue of the thermal effects of having a lower co-efficient of thermal expansion relative to the rotor steel. The latter suffers from having a lower creep strength than the rotor steel, so that the prolongation of the rotor life would be limited.

SUMMARY OF THE INVENTION

It is therefore an object of the invention to provide a process which results in a rotor that does not have the creep life normally attributable to the parent metal substantially shortened as a consequence of the creep-life of the weld metal and in which the co-efficient of thermal expansion of the parent metal and weld metal are comparably similar or identical.

In an exemplary embodiment, a method of forming a rotor comprises the steps of providing a rotor element formed from steel and welding the rotor element, using a welding process employing a weld metal which comprises: from 0.04 to 0.1% carbon, from 0 to 0.5% silicon, from 0.1 to 0.6% manganese, from 0 to 0.01% sulphur, from 0 to 0.03% phosphorous, from 1.9 to 2.6% chromium, from 0.05 to 0.3% molybdenum, from 0.2 to 0.3% vanadium, from 0.02 to 0.08% niobium, from 1.45 to 2.1% tungsten, from 0 to 0.03% nitrogen, from 0.0005 to 0.006% boron and from 0 to 0.03% aluminium.

In a further exemplary embodiment, a method of forming a rotor comprises removing at least a portion of a creep-life expired region of a first rotor element formed from a steel, replacing the removed portion of the first rotor element by welding the rotor element with a weld metal or by welding a second rotor element to the first rotor element with the weld metal, heat treating the rotor at a temperature range of 650° C. to 750° C., and machining the rotor to remove at least a portion of the weld metal. The weld metal comprises 0.04 to 0.1% carbon, 0 to 0.5% silicon, 0.1 to 0.6% manganese, 0 to 0.01% sulphur, 0 to 0.03% phosphorous, 1.9 to 2.6% chromium, 0.05 to 0.3% molybdenum, 0.2 to 0.3% vanadium, 0.02 to 0.08% niobium, 1.45 to 2.1% tungsten, 0 to 0.03% nitrogen, 0.0005 to 0.006% boron, and 0 to 0.03% aluminium.

An exemplary rotor for a turbine comprises a rotor element and weld metal welded to the rotor element. The weld metal comprises: from 0.04 to 0.1% carbon, from 0 to 0.5% silicon, from 0.1 to 0.6% manganese, from 0 to 0.01% sulphur, from 0 to 0.03% phosphorous, from 1.9 to 2.6% chromium, from 0.05 to 0.3% molybdenum, from 0.2 to 0.3% vanadium, from 0.02 to 0.08% niobium, from 1.45 to 2.1% tungsten, from 0 to 0.03% nitrogen, from 0.0005 to 0.006% boron and from 0 to 0.03% aluminium.

BRIEF DESCRIPTION OF THE DRAWING

A preferred embodiment of the invention is disclosed in the following description and illustrated in the accompanying drawing, in which:

FIG. 1 shows creep rupture strengths for the described rotor according to the invention in comparison with examples of the prior art.

DETAILED DESCRIPTION OF THE INVENTION

According to a first aspect of the invention, there is provided a method of forming a rotor comprising the steps of: (i) providing a rotor element formed from steel; and (ii) welding the rotor element, using a welding process employing a weld metal which comprises: from 0.04 to 0.1% carbon, from 0 to 0.5% silicon, from 0.1 to 0.6% manganese, from 0 to 0.01% sulphur, from 0 to 0.03% phosphorous, from 1.9 to 2.6% chromium, from 0.05 to 0.3% molybdenum, from 0.2 to 0.3% vanadium, from 0.02 to 0.08% niobium, from 1.45 to 2.1% tungsten, from 0 to 0.03% nitrogen, from 0.0005 to 0.006% boron and from 0 to 0.03% aluminium.

This method can be used during manufacture or repair and can result in a rotor that has a good creep life that is predictable with a high degree of certainty, thereby enabling the service life of the rotor to be extended to a point relatively close to the actual end of the creep life of the rotor. The method also provides for a rotor having consistent thermal expansion coefficients, thereby avoiding undesirable operating stresses on the rotor.

Preferably, the said weld metal comprises at least 0.06% carbon. It is also preferred that the said weld metal comprises at least 0.3% manganese. It is further preferred that the said weld metal comprises 0.005% or less sulphur. It is still further preferred that the said weld metal comprises at least 1.7% tungsten. It is further preferred that the said weld metal comprises at least 0.04% niobium. It is further preferred that the said weld metal comprises 0.02% or less nitrogen. It is yet further preferred that the said weld metal further comprises 0.5% or less nickel.

In one particularly preferred embodiment, the said weld metal comprises substantially 0.075% carbon, 0.2% silicon, 0.5% manganese, 0.001% sulphur, 0.017% phosphorous, 2.2% chromium, 0.1% molybdenum, 0.1% nickel, 0.23% vanadium, 0.06% niobium, 0.05% titanium, 1.9% tungsten, 0.009% nitrogen, 0.003% boron and 0.02% aluminium.

The rotor element may be formed from steel which comprises from 0.15 to 0.35% carbon, from 0 to 0.3% silicon, from 0.2 to 1% manganese, from 0 to 0.03% sulphur, from 0 to 0.03% phosphorous, from 0.3 to 1% nickel, from 0.7 to 1.50% chromium, from 0.5 to 1.2% molybdenum, and from 0.2 to 0.4% vanadium.

In one particularly preferred embodiment, the rotor element is formed from steel comprising substantially 0.25% carbon, 0.23% silicon, 0.64% manganese, 0.005% sulphur, 0.01% phosphorous, 0.56% nickel, 0.8% chromium, 0.78% molybdenum, and 0.35% vanadium.

The method may comprise providing a second rotor element having a composition substantially the same as the said rotor element and welding the said second rotor element to the said rotor element using the said weld metal.

The said welding process may be a submerged-arc welding process.

The said method may further comprise a step of machining a rotor component to form at least one of the said rotor elements.

The said method may also comprise a step of machining the said weld metal after the weld has been formed.

According to a second aspect of the invention there is provided a rotor for a steam turbine, comprising a rotor element and weld metal welded to the said rotor element; wherein the weld metal comprises: from 0.04 to 0.1% carbon, from 0 to 0.5% silicon, from 0.1 to 0.6% manganese, from 0 to 0.01% sulphur, from 0 to 0.03% phosphorous, from 1.9 to 2.6% chromium, from 0.05 to 0.3% molybdenum, from 0.2 to 0.3% vanadium, from 0.02 to 0.08% niobium, from 1.45 to 2.1% tungsten, from 0 to 0.03% nitrogen, from 0.0005 to 0.006% boron and from 0 to 0.03% aluminium.

Preferably, the said weld metal comprises at least 0.06% carbon. It is further preferred that the said weld metal comprises at least 0.3% manganese. It is still further preferred that the said weld metal comprises 0.005% or less sulphur. It is yet further preferred that the said weld metal comprises at least 1.7% tungsten. In one preferred embodiment, the said weld metal comprises at least 0.04% niobium. It is further preferred that the said weld metal comprises 0.02% or less nitrogen. It is yet further preferred that the said weld metal further comprises 0.5% or less nickel.

In one particularly preferred embodiment, the said weld metal comprises substantially 0.075% carbon, 0.2% silicon, 0.5% manganese, 0.001% sulphur, 0.017% phosphorous, 2.2% chromium, 0.1% molybdenum, 0.1% nickel, 0.23% vanadium, 0.06% niobium, 0.05% titanium, 1.9% tungsten, 0.009% nitrogen, 0.003% boron and 0.02% aluminium.

The rotor element may be formed from steel which comprises from 0.15 to 0.35% carbon, from 0 to 0.3% silicon, from 0.2 to 1% manganese, from 0 to 0.03% sulphur, from 0 to 0.03% phosphorous, from 0.3 to 1% nickel, from 0.7 to 1.50% chromium, from 0.5 to 1.2% molybdenum, and from 0.2 to 0.4% vanadium.

In one particularly preferred embodiment, the rotor element is formed from steel comprising substantially 0.25% carbon, 0.23% silicon, 0.64% manganese, 0.005% sulphur, 0.01% phosphorous, 0.56% nickel, 0.8% chromium, 0.78% molybdenum, and 0.35% vanadium.

Embodiments of a method and a rotor in accordance with the invention, will now be described, by way of example and with reference to FIG. 1, which shows creep rupture strengths for the described rotor according to the invention in comparison with examples of the prior art.

This embodiment is a repair process conducted on an early stage disk head of a rotor.

The invention is not, of course, limited to use with this particular type of rotor component.

The rotor is formed from 1% CrMoV steel having a composition:

C: 0.25%
Si: 0.23%
Mn: 0.64%
S: 0.005%
P: 0.01%
Ni: 0.56%
Cr: 0.80%

Mo: 0.78%
V: 0.35%
Fe: 96.375%

The disk head has a creep-life expired region that is to be repaired and the metal in this region is therefore initially machined away to define a rotor element, upon which the welding process is to be performed.

In this particular embodiment, the invention makes use of a submerged-arc welding process, which is generally well known. Other welding processes could be employed, if preferred.

The weld metal, as is common in submerged-arc welding, takes the form of a consumable wire and, in this example, has the following composition:

C: 0.075%
Si: 0.2%
Mn: 0.5%
S: 0.001%
P: 0.017%
Cr: 2.2%
Mo: 0.1%
Ni: 0.1%
V: 0.23%
Nb: 0.06%
Ti: 0.05%
W: 1.9%
N: 0.009%
Al: 0.02%
B: 0.003%
Fe: 94.535%.

Prior to the commencement of the welding, a layer of flux powder is placed on the surface of the rotor element. A bonded or fused flux could be used and the selection will depend upon the particular welding circumstances. This is not a feature of the invention and will, therefore, not be discussed further. As is usual, the welding is effected by the formation of an arc between the wire electrode and the rotor element. The arc is caused to move along the rotor element and, as it does so, excess flux is recycled via a hopper. Remaining fused slag layers are removed after welding.

Following welding, a heat treatment at a temperature ranging between 650° C. and 750° C. is performed.

The final stage is to machine the weld metal.

The resulting weld has a high creep strength, which is similar to that of the rotor steel. It also has physical properties which are similar to those of the rotor steel. Accordingly, the overall creep strength of the resulting, repaired rotor is not compromised as a consequence of the weld and the creep-life is highly predictable and can be guaranteed for a relatively long period. Furthermore, there is no disparity between the physical characteristics, and particularly the co-efficients of thermal expansion, of the rotor steel and the weld metal, thereby avoiding detrimental stresses when thermal variations occur.

FIG. 1 shows the cross-weld strength of the welded metal in the above embodiment, relative to Larson-Miller parameter (P). For comparison, FIG. 1 also shows the cross-weld strengths of the two known weld metals discussed above (5% Cr and 2% CrMo) and the scatterband for the 1% CrMoV steel from which the rotor element is made. It is clear from the FIGURE that the strength for the embodiment of the invention falls well within the scatterband for the rotor, unlike the known weld metals which offer lower strength, falling outside the scatterband.

It should be understood that the above embodiment is merely an example of a process, in accordance with the invention, resulting in a rotor in accordance with the invention.

In particular, it should be understood that the rotor steel may have any of a range of compositions and can comprise, inter alia:

C: from 0.15 to 0.35%
Si: from 0 to 0.3%
Mn: from 0.2 to 1%
S: from 0 to 0.03%
P: from 0 to 0.03%
Ni: from 0.3 to 1%
Cr: from 0.7 to 1.5%
Mo: from 0.5 to 1.2%
V: from 0.2 to 0.4%.

Similarly, the weld metal may have any of a range of compositions and can comprise inter alia:

C: from 0.04 to 0.1%
Si: from 0 to 0.5%
Mn: from 0.1 to 0.6%
S: from 0 to 0.01%
P: from 0 to 0.03%
Cr: from 1.9 to 2.6%
Mo: from 0.05 to 0.3%
V: from 0.2 to 0.3%
Nb: from 0.02 to 0.08%
W: from 1.45 to 2.1%
N: from 0 to 0.03%
Al: from 0 to 0.03%
B: from 0.0005 to 0.006%.

Furthermore, within these ranges, a number of preferred ranges exist, as follows.

If the amount of carbon in the weld metal is 0.06% or more, it has been found that strength characteristics of the weld are particularly good.

If the amount of manganese in the weld metal is 0.3% or more or the amount of sulphur is 0.005% or less, it has been found that the likelihood of hot cracking is reduced. The effect is particularly pronounced if both conditions are met.

If the amount of tungsten in the weld metal is 1.7% or more, it has been found that strength characteristics of the weld are particularly good.

If the amount of niobium in the weld metal is 0.04% or more, it has been found that strength characteristics of the weld are particularly good.

If the amount of nitrogen in the weld metal is 0.02% or less, it has been found that the level of porosity of the weld metal can be kept low.

As will be apparent from the above example, nickel may also be included in the weld metal alloy, in which case, if it constitutes 0.5% or less, it has been found that the long term creep strength of the weld metal can be maximised.

It should further be understood that the invention is not limited for use in the type of rotor discussed above. Its application can extend to most types of rotor, made from a wide range of steels.

Although the above repair was effected by machining away the creep-expired material and replacing this material by weld metal; it could alternatively be the case that the creep-expired material is replaced by a further rotor element, which is welded to the original element. In such a case, the rotor weld elements could actually be integrally formed, in some region other than the weld region, prior to the weld. In other words, it is not necessary for the rotor elements to be discrete components, they could be joined parts of a single component.

It is emphasised that the invention is not limited to the repair of rotors nearing the expiry of their creep-life, but is applicable to other types of repair and also manufacture. For example, the invention is highly effective in the modification of rotors by weld build-up prior to service.

Many further modifications and variations will suggest themselves to those versed in the art upon making reference to the foregoing illustrative embodiment, which is not intended to limit the scope of the invention, that being determined by the appended claims.

What is claimed is:

1. A method of forming a rotor comprising the steps of:
   (i) providing a rotor element formed from steel; and
   (ii) welding the rotor element, using a welding process employing a weld metal which comprises: from 0.04 to 0.1% carbon, from 0 to 0.5% silicon, from 0.1 to 0.6% manganese, from 0 to 0.01% sulphur, from 0 to 0.03% phosphorous, from 1.9 to 2.6% chromium, from 0.05 to 0.3% molybdenum, from 0.2 to 0.3% vanadium, from 0.02 to 0.08% niobium, from 1.45 to 2.1% tungsten, from 0 to 0.03% nitrogen, from 0.0005 to 0.006% boron and from 0 to 0.03% aluminium, remainder iron.

2. The method according to claim 1, wherein the weld metal comprises at least 0.06% carbon.

3. The method according to claim 1, wherein the weld metal comprises at least 0.3% manganese.

4. The method according to claim 1, wherein the weld metal comprises 0.005% or less sulphur.

5. The method according to claim 1, wherein the weld metal comprises at least 1.7% tungsten.

6. The method according to claim 1, wherein the weld metal comprises at least 0.04% niobium.

7. The method according to claim 1, wherein the weld metal comprises 0.02% or less nitrogen.

8. The method according to claim 1, wherein the weld metal further comprises 0.5% or less nickel.

9. The method according to claim 1, wherein the weld metal comprises 0.075% carbon, 0.2% silicon, 0.5% manganese, 0.001% sulphur, 0.017% phosphorous, 2.2% chromium, 0.1% molybdenum, 0.1% nickel, 0.23% vanadium, 0.06% niobium, 0.05% titanium, 1.9% tungsten, 0.009% nitrogen, 0.003% boron and 0.02% aluminium.

10. The method according to claim 1, wherein the rotor element is formed from steel which comprises from 0.15 to 0.35% carbon, from 0 to 0.3% silicon, from 0.2 to 1% manganese, from 0 to 0.03% sulphur, from 0 to 0.03% phosphorous, from 0.3 to 1% nickel, from 0.7 to 1.50% chromium, from 0.5 to 1.2% molybdenum, and from 0.2 to 0.4% vanadium.

11. The method according to claim 10, wherein the rotor element is formed from steel comprising 0.25% carbon, 0.23% silicon, 0.64% manganese, 0.005% sulphur, 0.01% phosphorous, 0.56% nickel, 0.8% chromium, 0.78% molybdenum, and 0.35% vanadium.

12. The method according to claim 1, comprising providing a second rotor element having a composition substantially the same as the rotor element and welding the second rotor element to the rotor element using the weld metal.

13. The method according to claim 1, wherein the welding process is a submerged-arc welding process.

14. The method according to claim 1, wherein the method comprises a step of machining a rotor component to form the rotor element.

15. The method according to claim 1, comprising a step of machining the weld metal after the step of welding.

16. A rotor for a turbine, comprising a steel rotor element and weld metal welded to the rotor element, wherein the weld metal comprises: from 0.4 to 0.1% carbon, from 0 to 0.5% silicon, from 0.1 to 0.6% manganese, from 0 to 0.01% sulphur, from 0 to 0.03% phosphorous, from 1.9 to 2.6% chromium, from 0.05 to 0.3% molybdenum, from 0.2 to 0.3% vanadium, from 0.02 to 0.08% niobium, from 1.45 to 2.1% tungsten, from 0 to 0.03% nitrogen, from 0.0005 to 0.006% boron and from 0 to 0.03% aluminium, remainder iron.

17. The rotor according to claim 16, wherein the weld metal comprises at least 0.06% carbon.

18. The rotor according to claim 16, wherein the weld metal comprises at least 0.3% manganese.

19. The rotor according to claim 16, wherein the weld metal comprises 0.005% or less sulphur.

20. The rotor according to claim 16, wherein the weld metal comprises at least 1.7% tungsten.

21. The rotor according to claim 16, wherein the weld metal comprises at least 0.04% niobium.

22. A rotor according to claim 16, wherein the weld metal comprises 0.02% or less nitrogen.

23. A rotor according to claim 16, wherein the weld metal further comprises 0.5% or less nickel.

24. A rotor according to claim 16, wherein the weld metal comprises 0.075% carbon, 0.2% silicon, 0.5% manganese, 0.001% sulphur, 0.017% phosphorous, 2.2% chromium, 0.1% molybdenum, 0.1% nickel, 0.23% vanadium, 0.06% niobium, 0.05% titanium, 1.9% tungsten, 0.009% nitrogen, 0.003% boron and 0.02% aluminium.

25. A rotor according to claim 16, wherein the rotor element is formed from steel which comprises from 0.15 to 0.35% carbon, from 0 to 0.3% silicon, from 0.2 to 1% manganese, from 0 to 0.03% sulphur, from 0 to 0.03% phosphorous, from 0.3 to 1% nickel, from 0.7 to 1.50% chromium, from 0.5 to 1.2% molybdenum, and from 0.2 to 0.4% vanadium.

26. A rotor according to claim 25, wherein the rotor element is formed from steel comprising 0.25% carbon, 0.23% silicon, 0.64% manganese, 0.005% sulphur, 0.01% phosphorous, 0.56% nickel, 0.8% chromium, 0.78% molybdenum, and 0.35% vanadium.

27. The method according to claim 12, wherein welding the second rotor element to the rotor element is a submerged-arc welding process.

28. The method according to claim 12, wherein the method comprises a step of machining a rotor component to form the second rotor element.

29. The method according to claim 12, comprising a step of machining the weld metal after the step of welding the second rotor element to the rotor element.

30. A method of forming a rotor comprising the steps of:
    removing at least a portion of a creep-life expired region of a first rotor element, the first rotor element formed from a steel;
    replacing the removed portion of the first rotor element by welding the rotor element with a weld metal or by welding a second rotor element to the first rotor element with the weld metal, the weld metal comprising 0.04 to 0.1% carbon, 0 to 0.5% silicon, 0.1 to 0.6% manganese, 0 to 0.1% sulphur, 0 to 0.03% phosphorous, 1.9 to 2.6% chromium, 0.05 to 0.3% molybdenum, 0.2 to 0.3% vanadium, 0.02 to 0.08% niobium, 1.45 to 2.1% tungsten, 0 to 0.03% nitrogen, 0.0005 to 0.006% boron, and 0 to 0.03% aluminium, remainder iron;
    heat treating the rotor at a temperature range of 650° C. to 750° C.; and
    machining the rotor to remove at least a portion of the weld metal.

* * * * *